United States Patent
Yamaguchi

(10) Patent No.: US 8,649,181 B2
(45) Date of Patent: Feb. 11, 2014

(54) TIRE CONDITION DETECTING DEVICE

(75) Inventor: Shigeru Yamaguchi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/390,449

(22) PCT Filed: Aug. 20, 2010

(86) PCT No.: PCT/JP2010/064114
§ 371 (c)(1),
(2), (4) Date: Apr. 6, 2012

(87) PCT Pub. No.: WO2011/021701
PCT Pub. Date: Feb. 24, 2011

(65) Prior Publication Data
US 2012/0188695 A1 Jul. 26, 2012

(30) Foreign Application Priority Data
Aug. 21, 2009 (JP) ................. 2009-191919

(51) Int. Cl.
*H05K 7/00* (2006.01)
(52) U.S. Cl.
USPC ............ 361/728; 340/442; 73/146; 165/80.3; 174/50
(58) Field of Classification Search
USPC .......... 361/728, 729, 730, 734; 340/442, 438; 73/146.3; 174/521, 522, 524, 534, 50.5
See application file for complete search history.

(56) References Cited

U.S. PATENT DOCUMENTS

| | | | |
|---|---|---|---|
| 4,158,757 A * | 6/1979 | Reichert et al. ............ 200/302.1 |
| 2005/0046556 A1 | 3/2005 | Katou | |
| 2006/0006993 A1 | 1/2006 | Katou et al. | |
| 2010/0148950 A1 | 6/2010 | Yamaguchi et al. | |
| 2011/0216487 A1 * | 9/2011 | Sakai ...................... 361/679.01 |

FOREIGN PATENT DOCUMENTS

| | | |
|---|---|---|
| JP | A-11-321256 | 11/1999 |
| JP | A-2003-112506 | 4/2003 |
| JP | A-2005-67544 | 3/2005 |
| JP | A-2006-33047 | 2/2006 |
| JP | A-2006-329883 | 12/2006 |
| JP | A-2007-278761 | 10/2007 |
| WO | WO 2008/018585 A1 | 2/2008 |
| WO | WO 2008018585 A1 * | 2/2008 |

OTHER PUBLICATIONS

International Search Report mailed Nov. 22, 2010 issued in International Patent Application No. PCT/JP2010/064114 (with translation).
Canadian Office Action dated Sep. 23, 2013 from Canadian Patent Application No. 2,771,694.

* cited by examiner

*Primary Examiner* — Hoa C Nguyen
*Assistant Examiner* — Keith Depew
(74) *Attorney, Agent, or Firm* — Oliff PLC

(57) ABSTRACT

A tire condition detecting device according to the present invention includes: an electronic component including a sensor configured to detect a tire condition; and a casing configured to house the electronic component. The casing includes a casing main body configured to house the electronic component and having an opening surface formed thereon, and a lid unit configured to cover the opening surface. An inside of the casing main body having the opening surface covered by the lid unit is filled with a sealant. Accordingly, tire conditions such as inner pressure and temperature of a tire can be surely detected and a breakdown of an electronic component can be prevented even in an environment where water content such as a coolant is injected in the tire.

4 Claims, 6 Drawing Sheets

TIRE CONDITION DETECTING DEVICE

TECHNICAL FIELD

The present invention relates to a tire condition detecting device having an electronic component including a detector configured to detect tire conditions such as inner pressure and temperature of a tire.

BACKGROUND ART

Heretofore, for a tire condition detecting device configured to detect tire conditions such as inner pressure and temperature of a tire, the following structure has been widely adopted. Specifically, electronic components such as a transmitter and a pressure-temperature sensor are mounted on a circuit board which is housed in a casing (box unit) made from a synthetic resin.

For such a tire condition detecting device, a method is known in which the circuit board housed in the casing having an opening surface formed thereon is sealed with a sealant such as an epoxy based resin (for example, Patent Document 1). Sealing the circuit board housed in the casing with the sealant can suppress a breakdown of the tire condition detecting device, which would otherwise be caused by vibration or moisture.

The tire condition detecting device thus highly waterproofed is widely employed to a tire which is mounted on a dump truck used in mining mountains. This is because the tire has a coolant injected therein to suppress increase in temperature by running.

PRIOR ART DOCUMENT

Patent Document

Patent Document 1: Japanese Patent Application Publication No 2006-329883 (Page 4, FIG. 1)

SUMMARY OF THE INVENTION

However, the conventional tire condition detecting device described above has the following problems. Specifically, an environment inside the tire in which water content such as the coolant is injected brings the tire condition detecting device into a completely immersed state, depending on the position where the tire condition detecting device is installed, the amount of the water content such as the coolant, and so forth. In other words, in the state, the surface, on the opening surface side, of the sealant is completely immersed in the water content such as the coolant which permeates through the sealant particularly because a high-temperature, high-pressure situation is created inside the tire.

In such a case, the deterioration of the sealant is likely to progress. Thereby, the sealant 370 is deformed, disrupting the adhesive interface between the sealant and the casing. Hence, the water content such as the coolant infiltrates the electronic components, and breaks down the electronic components. This results in a problem that the tire conditions such as inner pressure and temperature of the tire cannot be detected.

Accordingly, an object of the present invention is to provide a tire condition detecting device capable of surely detecting tire conditions such as inner pressure and temperature of a tire and preventing a breakdown of an electronic component even in an environment where water content such as a coolant is injected in the tire.

To achieve the above object, the present invention has the following aspects. The first aspect of the present invention is summarized as a tire condition detecting device (tire condition detecting device 100) comprising: an electronic component (electronic component 200) including a detector (sensor 210) configured to detect a tire condition (such as inner pressure of a pneumatic tire 1); and a casing (casing 300) configured to house the electronic component, wherein the casing includes a box unit (casing main body 310) configured to house the electronic component, and having an opening surface (opening surface 310A) formed thereon, and a lid unit (lid unit 320) configured to cover the opening surface, and an inside of the box unit having the opening surface covered by the lid unit is filled with a sealant (sealant 370).

According to such an aspect, the inside of the box unit having the opening surface covered by the lid unit is filled with the sealant. Thereby, in an environment inside the tire in which water content such as a coolant is injected, even when the tire condition detecting device is completely immersed, the sealant is never directly immersed in the water content. This retards progress in the deterioration of the sealant. Accordingly, the sealant can be prevented from deforming, and a disruption of the adhesive interface between the sealant and the casing can be surely prevented. Thus, a breakdown of the electronic component is prevented, and the tire conditions such as inner pressure and temperature of the tire can be surely detected.

The second aspect of the present invention is summarized as the tire condition detecting device according to the first aspect of the present invention, wherein the lid unit has a middle lid (middle plate 330) configured to cover the opening surface and come into contact with the sealant, and at least one outer lid (outer cover 340) located at an outer side of the box unit and farther away therefrom than the middle lid, the middle lid has a first hole (e.g., injection hole 332) portion and a second hole portion (e.g., discharge hole 333) formed therein, the second hole portion located at a different position from the first hole portion, an elastic member (O-ring 352, O-ring 353) is provided on each of a peripheral edge of the first hole portion and a peripheral edge of the second hole portion, and a closed space is formed between the outer lid and the middle lid with the elastic member in between.

The third aspect of the present invention is summarized as the tire condition detecting device according to the second aspect of the present invention, wherein the detector has an introduction pipe (introduction pipe 211) configured to communicatively connect the detector to an outside of the casing, the middle lid has a pipe insertion hole (pipe insertion hole 331) formed therein into which the introduction pipe is inserted, the outer lid has a recessed portion (recessed portion 342) formed therein, the recessed portion recessed outwardly of the box unit, a tip end portion (tip end portion 211A) of the introduction pipe is located in the recessed portion, and the recessed portion has one or a plurality of vents (vent 343) formed therein.

The fourth aspect of the present invention is summarized as the tire condition detecting device according to the third aspect of the present invention, wherein an elastic member (O-ring 354) is provided on a peripheral edge of the pipe insertion hole.

The aspects of the present invention can provide a tire condition detecting device capable of surely detecting tire conditions such as inner pressure and temperature of a tire and, preventing a breakdown of an electronic component even in an environment where water content such as a coolant is injected in the tire.

MODES FOR CARRYING OUT THE INVENTION

Figure 1:
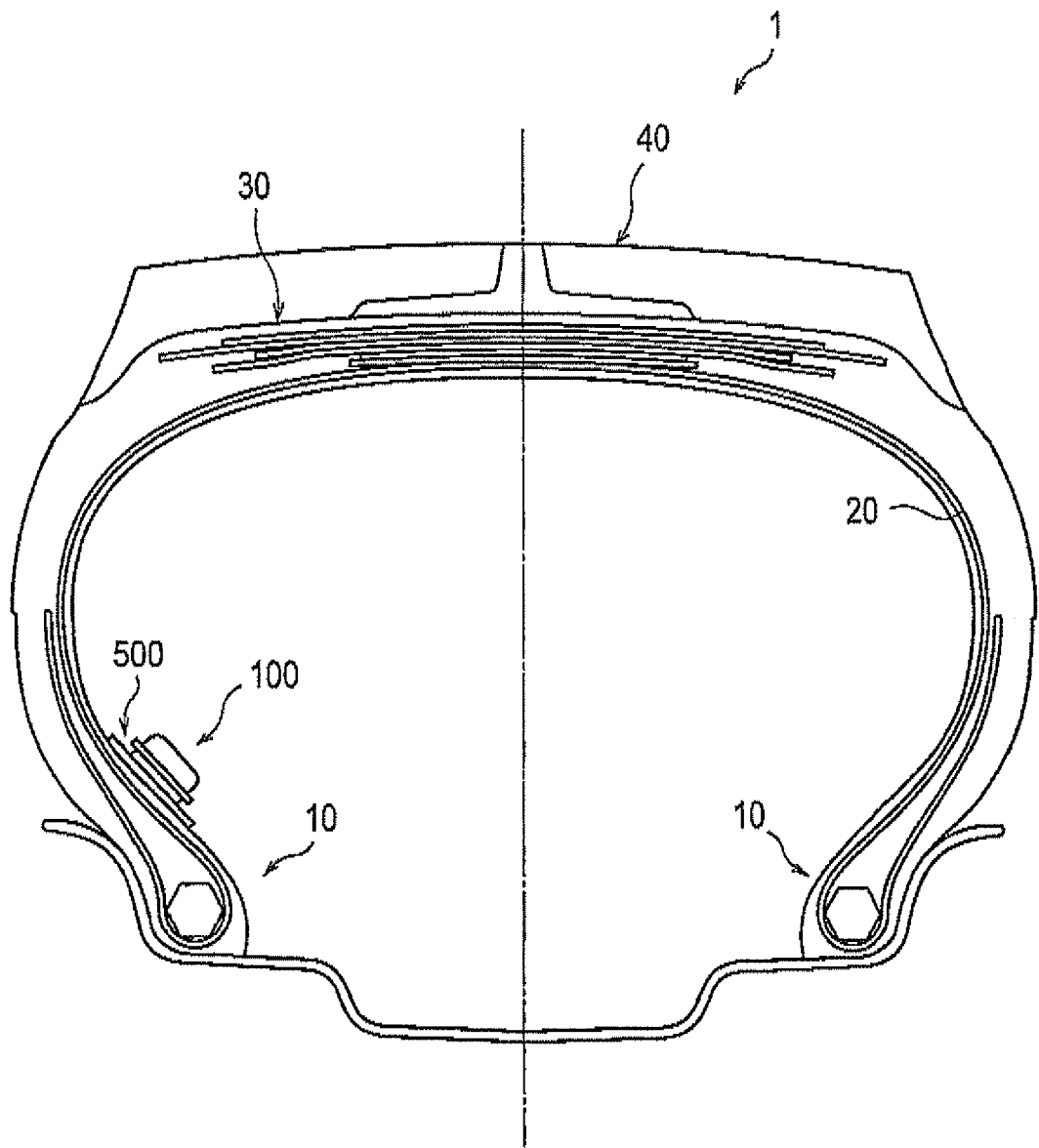
FIG. 1 is a cross-sectional -view taken in a tread width direction and showing the pneumatic tire 1 on which the tire condition detecting device 100 according to this embodiment is installed.

Next, an embodiment of a tire condition detecting device according to the present invention will be described by referring to the drawings. Specifically, the description will be given of (1) Configuration of Detecting Device-Fixing System, (2) Detailed Configuration of Tire Condition Detecting Device, (3) Sealant Filling Method, (4) Modification Example, (5) Comparative Evaluation, (6) Operations and Effects, and (7) Other Embodiments.

Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Configuration of Detecting Device-Fixing System

Figure 2:
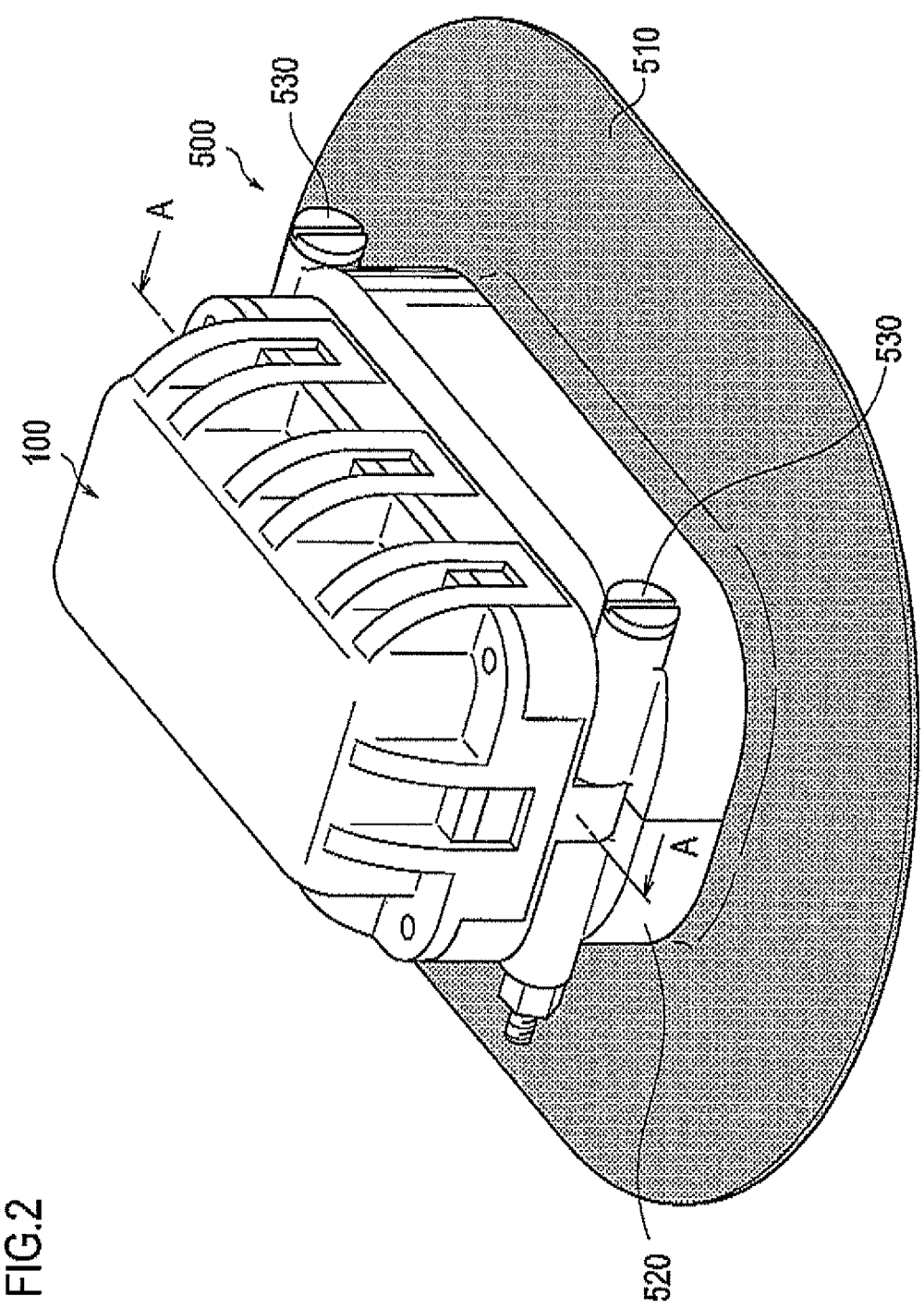
FIG. 2 is a perspective view showing the detecting device-fixing system 500 according to this embodiment.

First, a configuration of a detecting device-fixing system 500 for installing a tire condition detecting device 100 according to this embodiment on a pneumatic tire 1 will be described by referring to the drawings. FIG. 1 is a cross-sectional view taken in a tread width direction and showing the pneumatic tire 1 on which the tire condition detecting device 100 according to this embodiment is installed. FIG. 2 is a perspective view showing the detecting device-fixing system 500 according to this embodiment.

As shown in FIG. 1, the tire condition detecting device 100 is configured to detect tire conditions such as inner pressure and temperature of the pneumatic tire 1. Specifically, the tire condition detecting device 100 is installed on the pneumatic tire 1. Note that it is a matter of course that the tire conditions may include the tire wear state, the product name of the tire, the date of manufacture, the serial number, the lot number, and so forth besides the inner pressure and the temperature of the pneumatic tire 1.

In this embodiment, the pneumatic tire 1 is a tire mounted on a dump truck used in mining mountains. Water content such as a coolant is injected inside the pneumatic tire 1. Thereby, a high-temperature, high pressure situation is always created inside the pneumatic tire 1 by a high-humidity, high-pressure gas. As such a pneumatic tire 1 rolls, the water content such as the coolant is dispersed inside the pneumatic tire 1.

Such a pneumatic tire 1 includes: a bead portion 10 abutting a rim (unillustrated); a carcass layer 20 forming the frame of the pneumatic tire 1; multiple belt layers 30 disposed at an outer side, in a tire radial direction, of the carcass layer 20; and a tread portion 40 disposed at an outer side, in the tire radial direction, of the belt layer 30 and configured to come into contact with a road surface. Note that the pneumatic tire 1 may be filled with an inert gas such as a nitrogen gas instead of air.

With the detecting device-fixing system 500, the above-described tire condition detecting device 100 is installed on an inner surface 50 located on an inner circumferential surface of the carcass layer 20. Specifically, the tire condition detecting device 100 is installed on an inner liner located at an inner side, in the tread width direction, of the bead portion 10. As shown in FIG. 2, the detecting device-fixing system 500 includes a pedestal unit 510 and a fixing unit 520.

The pedestal unit 510 is configured to fix the tire condition detecting device 100 to the inner surface 50 of the pneumatic tire 1 with the fixing unit 520 interposed therebetween. The pedestal unit 510 is formed from an elastic material. The pedestal unit 510 is particularly preferably formed from the same elastic material as that of the inner surface 50 of the pneumatic tire 1.

The fixing unit 520 is configured to fix the tire condition detecting device 100 and the pedestal unit 510 with bolts 530 (fastening members) or the like. Moreover, the fixing unit 520 is configured to engage with a protruding part (unillustrated) formed on the pedestal unit 510. Thereby, the tire condition detecting device 100 is fixed to the inner surface 50 of the pneumatic tire 1.

(2) Detailed Configuration of Tire Condition Detecting Device

Figure 3:
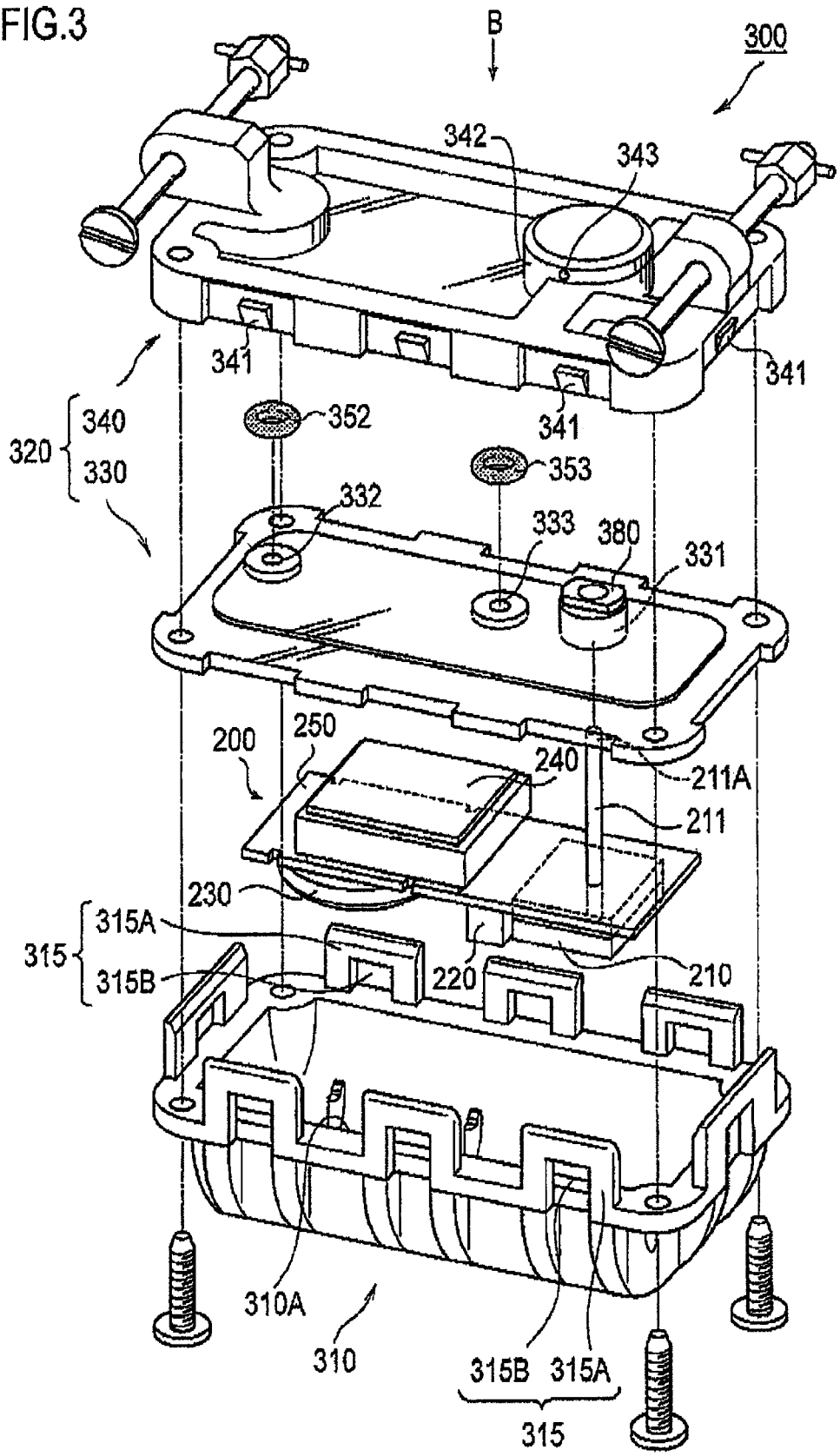
FIG. 3 is an exploded perspective view showing the tire condition detecting device 100 according to this embodiment.

Next, a detailed configuration of the tire condition detecting device 100 according to this embodiment will be described by referring to the drawings. FIG. 3 is an exploded perspective view showing the tire condition detecting device 100 according to this embodiment. FIG. 4(a) is a cross-sectional view (cross-sectional view taken along the line A-A in FIG. 2) showing part of the tire condition detecting device 100 according to this embodiment. FIG. 4(b) is a plan view (view seen in the direction of the arrow B in FIG. 3) of the tire condition detecting device 100 according to this embodiment. FIG. 5 is a perspective view showing an electronic component 200 and a casing main body 310 according to this embodiment.

Figure 4:
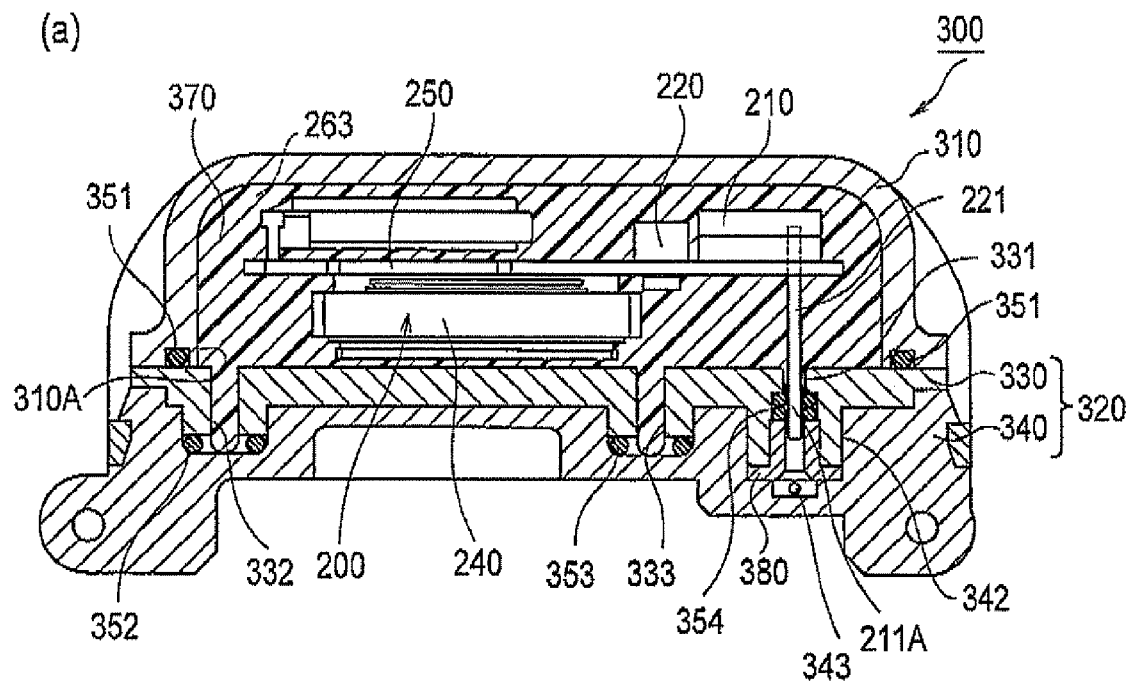
FIG. 4(a) is a cross-sectional view (cross-sectional view taken along the line A-A in FIG. 2) showing part of the condition detecting device 100 according to this embodiment.
FIG. 4(b) is a plan view (view seen in the direction of the arrow B in FIG. 3) of the tire condition detecting device 100 according to this embodiment.
Figure 4:
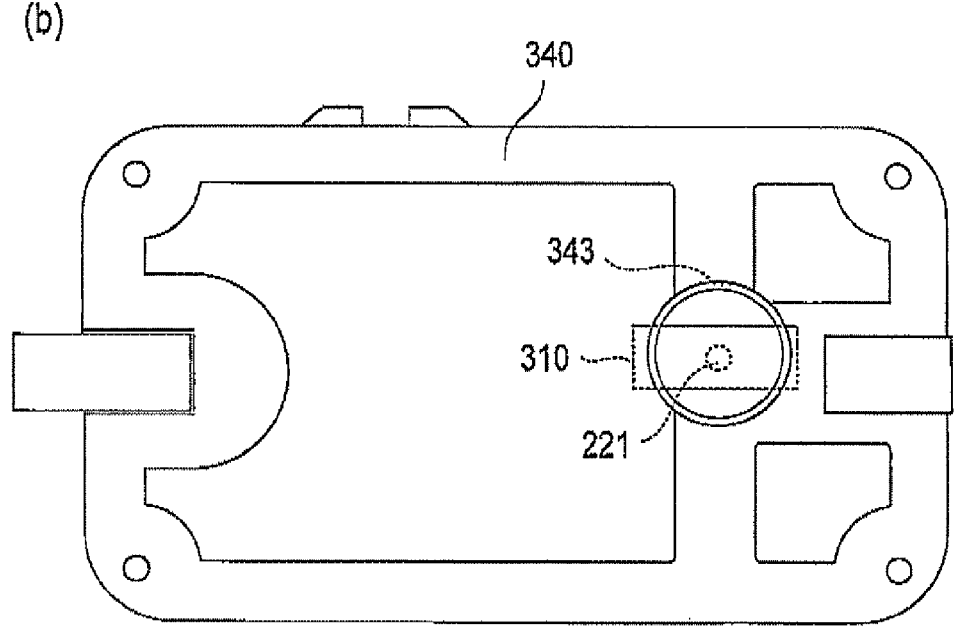
Figure 5:
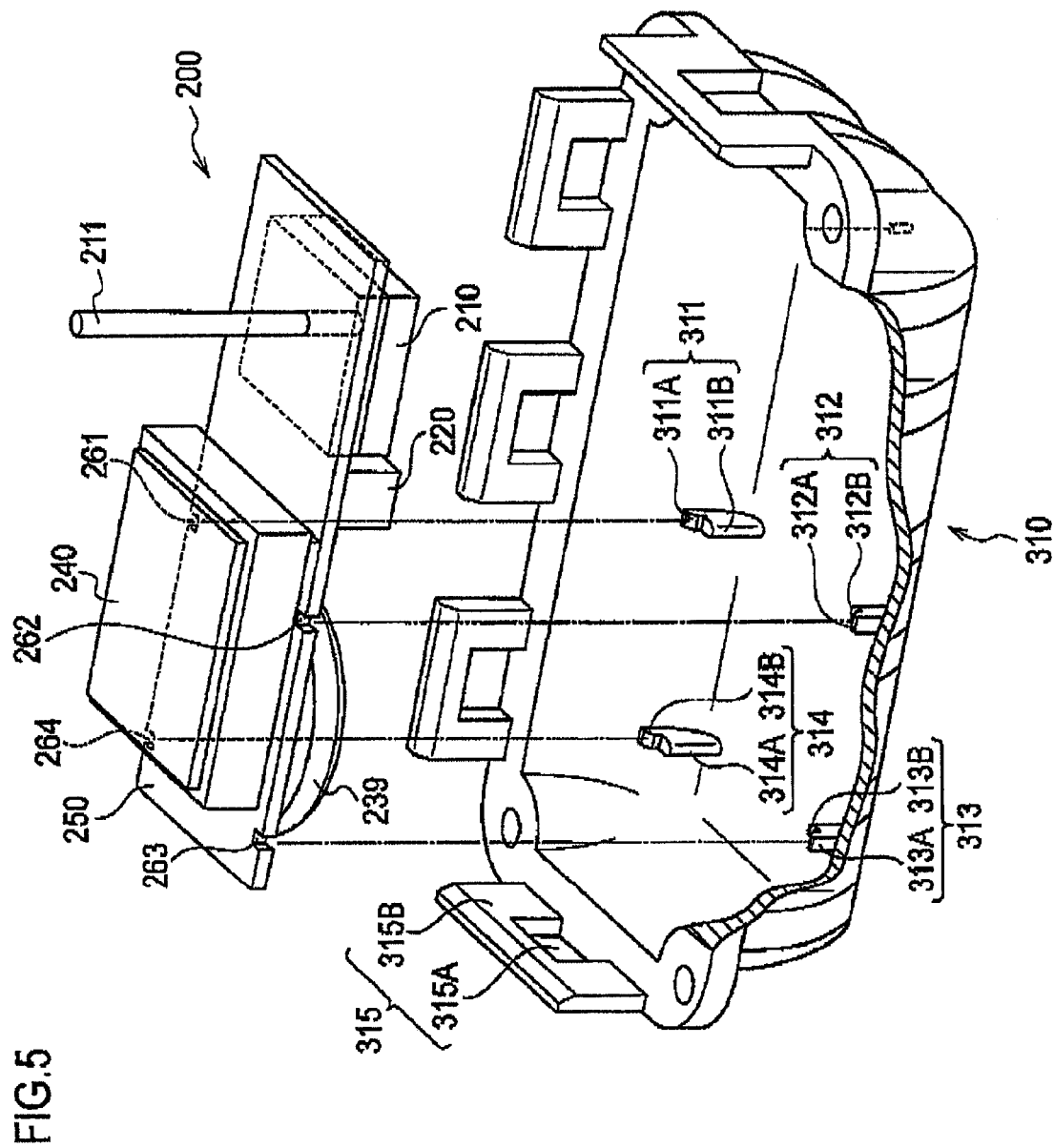
FIG. 5 is a perspective view showing an electronic component 200 and a casing main body 310 according to this embodiment.

As shown in FIGS. 3 and 4, the tire condition detecting device 100 has the electronic component 200 (see FIG. 4(a)), and, a casing 300 configured to house the electronic component 200. As shown in FIG. 4(a), a part in the casing 300 housing the electronic component 200 is filled with a sealant 370 formed using a synthetic resin which is hardly deformed at high temperature and high pressure (for example, an epoxy based resin or a urethane). Note that the filling method with the sealant 870 will be described later.

The electronic component 200 roughly includes a sensor 210 (detector), an antenna 220, a battery 230, and an electronic circuit unit 240. The sensor 210 is configured to detect the tire conditions such as inner pressure and temperature of the pneumatic tire 1. The sensor 210 has an introduction pipe 211 configured to communicatively connect the sensor 210 to the casing 300. The introduction pipe 211 has a cylindrical shape formed from a metal such as brass.

The antenna 220 is configured to transmit and receive a radio signal. The battery 230 is configured to supply an energy (electric power) to the sensor 210 and the like. The electronic circuit unit 240 includes a microcomputer configured to control a circuit board 250, a high-frequency modulation integrated circuit configured to modulate a signal output from the microcomputer to a high-frequency signal, a low-frequency demodulation integrated circuit configured to demodulate a low-frequency signal input to the antenna 220, and the like. Note that the housing for the electronic circuit unit 240 is formed from, for example, a nonmetallic inorganic material (for example, ceramic, glass) or the like.

The sensor 210, the antenna 220, the battery 230 and the electronic circuit unit 240 are disposed on the circuit, board 250. The circuit board 250 has a circuit pattern formed to electrically connect the units of the electronic component 200 to each other. Incidentally, a unit other than the sensor 210, the antenna 220, the battery 230 and the electronic circuit unit 240 may be provided on the circuit board 250.

As shown in FIG. 5, the circuit board 250 has cut-out portions 261, 262, 263, 264 formed therein. The cut-out portions 261 to 264 are provided at positions respectively opposite to protruding parts 311 to 314 formed on the casing main body 310 to be described later.

The casing 300 is formed from, for example, a nonmetallic organic material (for example, resin) or the like. The casing 300 includes the casing main body 310 (box unit) and a lid unit 320. The casing main body 310 is configured to house the electronic component 200 and has an opening surface 310A formed thereon.

As shown in FIG. 5, the protruding parts 311, 312, 313, 314 configured to support the circuit board 250 are formed on the inner surface of the casing main body 310. The protruding parts 311, 312, 313, 314 respectively have fitting portions 311A, 312A, 313A, 314A and root portions 311B, 312B, 313B, 314B.

The fitting portions 311A to 314A are provided closer to the opening surface 310A than the root portions 311B to 314B are. The fitting portions 311A to 314A are respectively fitted (inserted) into the cut-out portions 261 to 264 formed in the inner surface of the casing main body 310. At least one fitting portion of the fitting portions 311A to 314A has a size different from those of the other fitting portions.

In this embodiment, the fitting portion 311A is larger than the fitting portions 312A to 314A and larger than the cut-out portion 261. The fitting portions 312A to 314A have almost the same size as those of the cut-out portions 262 to 264. Note that the fitting portions 311A to 314A preferably have inclined surfaces that facilitate the fitting portions 311A to 314A to be fit into the cut-out portions 261 to 264, respectively.

Meanwhile, the root portions 311B to 314B protrude from the inner surface of the casing main body 310. The root portions 311B to 314B are formed larger than the cut-out portions 261 to 264. The heights of the root portions 311B to 314B from a bottom portion of the casing main body 310 are set to be such heights that the electronic component 200 does not come into contact with the inner surface of the casing main body 310.

Locking parts 315 configured to lock on an outer cover 340 (locking protrusions 341) to be described later are formed on an outer surface of an edge portion of the casing main body 310 where the opening surface 310A is formed (see FIG. 3). Each of the locking parts 315 includes: a hook portion 315A extending toward the lid unit 320 from the edge portion forming the opening surface 310A; and a locking hole 815B formed in the hook portion 315A and configured to lock on the locking protrusion 341 to be described later.

Such a casing main body 310 comes into contact with the middle plate 330 with an O-ring 351 (elastic member) in between, the O-ring 351 provided along an edge portion of the middle plate 330. The O-ring 351 is formed from a rubber or the like which is shaped to have a circular cross section. Note that the inside of the casing main body 310 having the opening surface 310A covered by the lid unit 820, that is, the entire space defined by the casing main body 310 and the middle plate 330 to be described later, is filled with the above-described sealant 370.

The lid unit 320 is configured to cover the opening surface 310A of the casing main body 310. The lid unit 320 is mounted on the casing main body 310 while being in surface contact with the surface of the sealant 370. The lid unit 320 has the middle plate 380 (middle lid) and the outer cover 340 (outer lid).

The middle plate 330 is configured to cover the opening surface 310A of the casing main body 310 and also configured to come into surface contact with the entire surface, at the opening surface 310A side, of the sealant 870. The middle plate 330 has a pipe insertion hole 331, an injection hole 332 (first hole portion), and a discharge hole 333 (second hole portion) formed therein.

The introduction pipe 211 is inserted into the pipe insertion hole 381. The injection hole 332 is used to inject the sealant 370. A gas inside the casing 300 is discharged (pushed out) from the discharge hole 333, when the sealant 370 is injected into the casing 300 (i.e., between the casing main body 310 and the middle plate 330) through the injection hole 332. Note that the pipe insertion hole 331, the injection hole 332 and the discharge hole 333 are located at different positions from one another.

Multiple (two) O-rings 354, an O-ring 352, and an O-ring 353 are provided on a peripheral edge of the pipe insertion hole 331, a peripheral edge of the injection hole 332, and a peripheral edge of the discharge hole 333, respectively. Note that the O-rings 352, 353 and 354 (elastic member) are formed from a rubber or the like which is shaped to have a circular cross section.

The outer cover 340 is located at an outer side of the casing main body 310 and farther away therefrom than the middle plate 330 is, and configured to come into surface contact with approximately the entire surface of the middle plate 330. At least one outer cover 340 should be provided. The locking protrusions 341 are formed on an outer edge portion of the outer cover 340, and protrude outwardly from the outer edge portion. Each of the locking protrusions 341 is configured to lock in the locking hole 315B formed at the casing main body 310.

The outer cover 340 has a recessed portion 342 formed therein, the recessed portion 842 recessed outwardly of the casing main body 310. The recessed portion 342 has one or multiple vents 343 formed therein. The vent 343 is configured to communicatively connect the introduction pipe 211 to the outside of the casing 300 (casing main, body 310). The vent 343 preferably has a smaller diameter than the introduction pipe 211. Note that a tip end portion 211A of the above-described introduction pipe 211 is communicatively connected to the recessed portion 342 and is located in the recessed portion 342.

Such an outer cover 340 comes into contact with the middle plate 330 with the multiple O-rings 354 and a communicative-connection interposer 380 in between. The multiple O-rings 354 are provided along the peripheral edge of the pipe insertion hole 331 formed in the middle plate 330, and the interposer 380 is configured to communicatively connect the vent 343 to the tip end portion 211A of the introduction pipe 211.

Moreover, the outer cover 340 comes into contact with the middle plate 330 with the O-ring 352 in between, the O-ring 352 provided along the peripheral edge of the injection hole 332 formed in the middle plate 330. Further, the outer cover 340 comes into contact with the middle plate 330 with the O-ring 353 in between, the O-ring 353 provided along the peripheral edge of the discharge hole 333 formed in the middle plate 330. Thereby, a closed space is formed between the outer cover 340 and the middle plate 330 with the O-ring 352 and the O-ring 353 in between.

(3) Sealant Filling Method

Next, a method of filling a part in the casing 300 housing the electronic component 200 with the sealant 370 will be described by referring to FIG. 4(a).

Firstly, the electronic component 200 is mounted on the casing main body 310 while the opening surface 310A side of the casing main body 310 faces upward (that is, in the state where the casing 300 in FIG. 4(a) is turned over). In this event, the protruding parts 311, 312, 313, 314 formed on the inner surface of the casing main body 310 are inserted (fitted) into the cut-out portions 261, 262, 263, 264 formed in the circuit board 250.

Specifically, the fitting portions 311A, 312A, 313A, 314A are respectively inserted into the cut-out portions 261, 262, 263, 264, and the circuit board 250 is placed on the root portions 311B, 312B, 313B, 314B. Thereby, the electronic component 200 is mounted on the casing main body 310 but the electronic component 200 does not come into contact with the it surface of the casing main body 310.

Secondly, the middle plate 330 is mounted on the opening surface 310A of the casing main body 310 while the opening surface 310A side of the casing main body 310 faces upward.

Thirdly, with the opening surface 310A side of the casing main body 310 facing upward on which the middle plate 330 is mounted, the sealant 370 is injected from the injection hole 332. In this event, a tip end portion (for example, the tip end of a needle) of a mechanism (unillustrated) for injecting the sealant 370 is inserted from the injection hole 332, and preferably inserted closer to a bottom portion side of the casing main body 310 than to the circuit board 250.

Fourthly, as the sealant 370 is injected, a gas inside the casing 300 (that is, a space between the casing main body 310 and the middle plate 330) is discharged from the discharge hole 833. In this event, the discharge hole 333 is preferably located uppermost to surely discharge the gas inside the casing 300.

Fifthly, the outer cover 340 is mounted on the casing main body 310 from the middle plate 330 side. This helps to avoid direct exposure of the sealant 370 to the inside of the pneumatic tire 1.

(4) Modification Example

Figure 6:
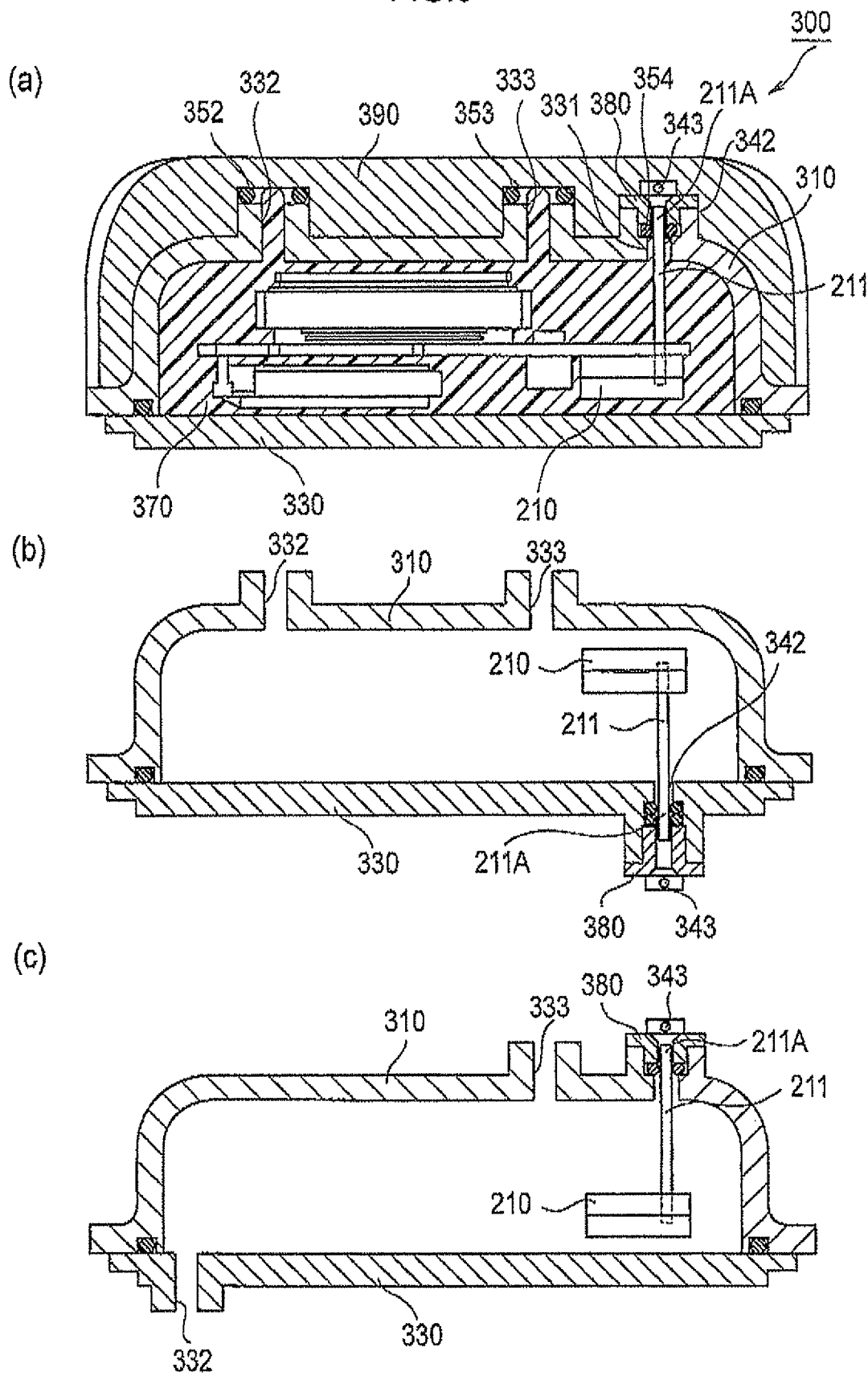
FIG. 6 is a cross-sectional view showing a part of a tire condition detecting device 100A according to Modification Example.

Next, Modification Example of the tire condition detecting device 100 according to the above-described embodiment will be described by referring to a drawing. FIG. 6 is a cross-sectional view showing a part of a tire condition detecting device 100A according to Modification Example. Note that the same reference signs denote same elements and portions as those of the tire condition detecting device 100 according to the above-described embodiment, and different elements and portions will be mainly described.

In the above-described embodiment, the pipe insertion hole 331, the injection hole 332 and the discharge hole 333 are formed in the middle plate 330. In addition, the recessed portion 342 is formed in the outer cover 340 in the embodiment.

In contrast, in Modification Example, as shown in FIG. 6(a), the pipe insertion hole 331, the injection hole 882, and the discharge hole 333 are formed in the casing main body 310. The O-ring 354, the O-ring 352 and the O-ring 353 are provided respectively on the peripheral edges of the pipe insertion hole 331, the injection hole 332 and the discharge hole 333. Moreover, an outer casing 390 configured to additionally cover the casing main body 310 has one or multiple recessed portions 342 formed therein.

Here, all of the pipe insertion hole 331, the injection hole 332 and the discharge hole 383 do not necessarily have to be formed in the casing main body 310. For example, as shown in FIG. 6(b), the injection hole 332 and the discharge hole 333 may be formed in the casing main body 310, while the pipe insertion hole 331 may be formed in middle plate 330 as in the embodiment. In this case, the recessed portion 342 is also formed in the outer cover 340 as in the embodiment.

Alternatively, as shown in FIG. 6(c), the pipe insertion hole 381 and the discharge hole 333 may be formed in the casing main body 310, while the injection hole 332 may be formed in the middle plate 330 as in the embodiment. Further, although unillustrated, the pipe insertion hole 331 and the injection hole 332 may be formed in the casing main body 310, while the discharge hole 333 may be formed in the middle plate 330 as in the embodiment.

As described above, it is a matter of course that the arrangement positions, the numbers, the shapes, and so forth of the pipe insertion hole 331, the injection hole 332, the discharge hole 333 and the recessed portion 342 may be different from those described in the embodiment and Modification Example (5) Comparative Evaluation Next, for further clarification of the effects of the present invention, description will be given of the comparative evaluation conducted using tire condition detecting devices according to Comparative Example and Example below. Specifically, the description will be given of (5-1) Configuration of Each Tire Condition Detecting Device and (5-2) Evaluation Result. Note that the present invention is not limited by these examples at all.

(5-1) Configuration of Each Tire Condition Detecting Device

The tire condition detecting device according to Comparative Example is one described in BACKGROUND ART. Specifically, in the tire condition detecting device according to Comparative Example, a closed space in which a sealant is absent is formed in a casing, and one end of an introduction pipe communicatively connected to a pressure sensor is disposed in the closed space. A water-proof filter is provided at a portion corresponding to a lid unit communicatively connected to the closed space.

The tire condition detecting device 100 according to Example is one described in the embodiment. Specifically, in the tire condition detecting device 100 according to Example, no such closed space as in Comparative Example is provided, and the pipe insertion hole 331 into which the introduction pipe 211 is inserted is formed in the lid unit 320.

(5-2) Evaluation Result

Next, the result of evaluating the durability of each tire condition detecting device will be described by referring to Table 1.

TABLE 1

|  | Comparative Example | Example |
|---|---|---|
| Durability (time until breakdown) | Approximately 10 hours | No breakdown until 250 hours |

In the durability test on the tire condition detecting devices, each of the tire condition detecting devices was completely immersed in a coolant. In this state, the time until each tire condition detecting device was broken down was measured under conditions of a temperature of 125° C. and a pressure of 1000 kPa.

As a result, it was found out that the tire condition detecting device 100 according to Example was 20 times or more as durable as the tire condition detecting device according to Comparative Example.

(6) Operations And Effects

In the above-described embodiment, the inside of the casing main body 310 having the opening surface 310A covered by the lid unit 320 is filled with the sealant 370. Thereby, in an environment inside the pneumatic tire 1 in which water content such as a coolant is injected, even when the tire condition detecting device 100 is completely immersed, the sealant 370 is never directly immersed in the water content. This retards progress in the deterioration of the sealant 370. Accordingly, the sealant 370 can be prevented from deforming, and a disruption of the adhesive interface between the sealant 370 and the casing can be surely prevented. Thus, a breakdown of the electronic component 200 is prevented, and the tire conditions such as inner pressure and temperature of the pneumatic tire 1 can be surely detected.

In the embodiment, the injection hole 332 and the discharge hole 333 are provided in the middle plate 330. Thereby, by injecting the sealant 370 into the casing 300 (i.e., between the casing main body 310 and the middle plate 330) through the injection hole 332, a gas inside the casing 300 is discharged (pushed out) from the discharge hole 333. This can suppress air entrapment in the casing 300, the inside of the casing 300 is surely hermetically closed by the sealant 370, and the electronic component 200 is also sealed with the sealant 370. Thus, infiltration of water content such as a coolant into the casing 300 can be further prevented.

Moreover, the O-ring 352 and the O-ring 353 are respectively provided on the peripheral edge of the injection hole 332 and the peripheral edge of the discharge hole 333. Specifically, the outer cover 340 comes into contact with the middle plate 330 with the O-ring 352 and the O-ring 353 in between. This makes it possible to more surely prevent infiltration of water content such as a coolant into the casing 300 from the injection hole 332 and the discharge hole 333.

Further, the lid unit 320 has the middle plate 330 (middle lid) and the outer cover 340 (outer lid). This makes it possible to surely prevent infiltration of water content such as a coolant into the casing 300 in comparison with a case where the lid knit 320 is formed of one member; moreover, the number of parts can be reduced in comparison with a case where the lid, unit 320 is formed of three or more members. In other words, both prevention of a breakdown of the electronic component 200 and, reduction in the number of parts can be achieved.

Furthermore, although the sealant 370 itself has waterproof and moisture-proof effects, the sealant 370 is generally made from a polymeric material. For this reason, if the sealant 370 is used in an environment saturated with vapor gas for an extended period, water content such as vapor gas gradually infiltrates between the casing 300 and the sealant 370. However, the middle plate 330 and the outer cover 340 thus provided can more surely prevent the sealant 370 from being directly immersed in such water content.

In the embodiment, the tip end portion 211A of the introduction pipe 211 is located in the recessed portion 342 in the outer cover 840 where the vent 343 is formed. This prevents direct exposure of the tip end portion 211A (introduction port) of the introduction pipe 211 to the outside, and a breakdown of the sensor 210 can be prevented.

In the embodiment, the introduction pipe 211 provided to the sensor 210 is inserted in the pipe insertion hole 331 formed in the lid unit 320. Thereby, the inside of the casing 300 can be filled with the sealant 370 without forming a closed space in which a sealant is absent in the casing as in the conventional technique. In other words, without forming such a closed space, the introduction pipe 211 communicatively connects the sensor 210 to the outside of the casing 300. Thus, water content such as a coolant never infiltrates into the casing 300, and the electronic component 200 can be surely prevented from coming into contact with the water content.

Moreover, since the introduction pipe 211 is directly communicatively connected to the inside of the pneumatic tire 1, the sealant 370 is never directly immersed in the water content. Thus, prevention of progress in the deterioration of the sealant 370, prevention of deformation of the sealant 370, prevention of a disruption at the adhesive interface between the sealant 370 and the casing, and so forth are more surely achieved.

In the embodiment, the O-ring 354 is provided on the peripheral edge of the pipe insertion hole 331. In the embodiment, the outer cover 340 comes into contact with the middle plate 330 with the O-ring 354 and the communicative-connection interposer 380 in between. This can further surely prevent infiltration of water content such as a coolant into the casing 300 from the pipe insertion hole 331.

In the embodiment, it is preferable to form the vent 343 as small as possible. In this case, infiltration of water content such as a coolant from the vent 343 can be suppressed as much as possible.

In the embodiment, as the inside of the casing 300 is filled with the sealant 370, a gas inside the casing 300 is discharged from the discharge hole 333. In this event, the discharge hole 333 is preferably located uppermost. Thereby, a gas inside the casing 300 is surely discharged, and surely no gas exists inside the casing 300. Note that since a high-temperature, high pressure situation is created inside the pneumatic tire 1, if a gas exists inside the casing 300, the gas may break down the electronic component 200 in the casing 300 in some cases.

Further, the tip end portion (for example, the tip end of a needle) of the mechanism for injecting the sealant 370 is preferably inserted closer to the bottom portion of the casing main body 310 than to the circuit board 250. Thereby, a gas between the circuit board 250 and the bottom portion of the casing main body 310 is more surely discharged from the discharge hole 333. This makes a gas hardly exist inside the casing 300, and can more surely suppress a breakdown of the electronic component 200.

In the embodiment, the fitting portions 311A to 314A are inserted (fitted) into the cut-out portions 261 to 264, and the circuit board 250 is placed on the root portions 311B to 314B. Thereby, the electronic component 200 can be stably placed in the casing main body 310 before the inside of the casing 300 is filled with the sealant 370.

Moreover, the heights of the root portions 311B to 314B are set to be such heights that the electronic component 200 does not come into contact with the inner surface of the casing main body 310 to be described later. Thereby, the electronic component 200 can be placed in the casing main body 310 without bringing the electronic component 200 into contact with the inner surface of the casing main body 310. Thus, a space between the bottom portion of the casing main body 310 and the electronic component 200 can be filled with the sealant 370, and the electronic component 200 can be more surely sealed with the sealant 370.

Further, the fitting portion 311A is larger than the fitting portions 312A to 314A and larger than the cut-out portion 261. Thereby, the fitting portion 811A is tightly fitted into the cut-out portion 261, and the electronic component 200 is firmly fixed inside the casing main body 310. This facilitates the operation of injecting the sealant 370 because the electronic component 200 is not displaced when the inside of the casing 300 is filled with the sealant 370; in addition, the electronic component 200 can be surely sealed.

Particularly, the fitting portions 311A to 314A preferably have inclined surfaces. This facilitates the cut-out portions 261 to 264 to fit onto the fitting portions 311A to 314A, and also to position the electronic component 200 inside the casing 300.

(7) Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, the embodiment of the present invention can be modified as follows. Specifically, the tire condition detecting device 100 has been described as being installed on the pneumatic tire 1 which is mounted on a dump truck used in mining mountains. However, the present invention is not limited thereto. The tire condition detecting device 100 may be installed on tires which are mounted on large-size vehicles (such as a grader, a shovel machine, a crane) other than the dump track.

Moreover, the tire condition detecting device 100 has been described as being installed on the inner liner located at the inner side, in the tread width direction, of the bead portion 10. However, the present invention is not limited thereto. For example, the tire condition detecting device 100 may be installed at an inner side of the tread portion 40, a side portion, a rim portion, or the like, and may be installed anywhere on the inner surface 50 of the pneumatic tire 1.

Further, the tire condition detecting device 100 has been described as being installed on the pneumatic tire 1 with the detecting device-fixing system 500 including the pedestal unit 510 and the fixing unit 520. However, it is a matter of course that the present invention is not limited thereto, as long as the tire condition detecting device 100 is installed on the pneumatic tire 1. In other words, the detecting device-fixing system 500 may have a configuration (for example, a pedestal unit and a fixation band) other than that described in the embodiment. Moreover, the electronic component 200 and the casing 300 may also have configurations other than those described in the embodiment.

Furthermore, the lid unit 320 has been described as being constituted of the two members (the middle plate 330 and the outer cover 340). However, the present invention is not limited thereto. The lid unit 320 may be constituted of one member or three or more members.

Furthermore, the vent 343 has been described as being formed in the recessed portion 342 in the outer cover 340. However, the present invention is not limited thereto, as long as the vent 343 is provided at such a position as to communicatively connect the introduction pipe 211 to the outside of the casing main body 310. For example, the vent 343 may be formed in the middle plate 330.

Furthermore, it has been described that the O-ring 352 is provided on the peripheral edge of the injection hole 332, and that the O-ring 353 is provided on the peripheral edge of the discharge hole 333. However, the present invention is not limited thereto. An elastic material (such as a rubber) other than the O-ring may be provided on the peripheral edge of each hole, as long as it is possible to prevent infiltration of water content such as a coolant from each hole.

Furthermore, it has been described that the cut-out portions 261 to 264 are formed in the electronic component 200, and that the protruding parts 811 to 314 are formed on the casing main body 310. However, the present invention is not limited thereto. The protruding part may be formed on the electronic component 200, while the cut-out portion may be formed in the casing main body 810.

Furthermore, it is a matter of course that the cut-out portion and the protruding part can be selected appropriately for each purpose, as long as the configuration does not allow the electronic component 200 to come into contact with the casing main body 310 (lid unit 320). Moreover, the shapes and numbers of the cut-out portions and the protruding parts can also be selected appropriately for each purpose.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2009-191919 (filed on Aug. 21, 2009) is incorporated herein by reference.

Industrial Applicability

Accordingly, the present invention can provide a tire condition detecting device capable of surely detecting tire conditions such as inner pressure and temperature of a tire and preventing a breakdown of an electronic component even in an environment where water content such as a coolant is injected in the tire,

EXPLANATION OF REFERENCE SIGNS

1: pneumatic tire
10: bead portion
20: carcass layer
30: belt layer
40: tread portion
50: inner surface
100, 100A: tire condition detecting device
200; electronic component
210: sensor
211: introduction pipe
211A: tip end portion
220: antenna
230: battery
240: electronic circuit unit
250: circuit board
261-264: cut-out portion
300: casing
310: casing main body (box unit)
310A: opening surface
311-314: protruding part
315: locking part
315A: hook portion
315B: locking hole
320: lid unit

330: middle plate (middle lid)
331: pipe insertion hole
332: infection hole
833: discharge hole
340: outer cover (outer lid)
341: locking protrusion
342: recessed portion
343: vent
351, 352, 353, 354: O-ring
370: sealant
380: communicative-connection interposer
390: outer casing
500: detecting device-fixing system
510: pedestal unit
520: fixing unit
530: bolt

The invention claimed is:

1. A tire condition detecting device comprising:
an electronic component including a detector configured to detect a tire condition; and
a casing configured to house the electronic component, the casing including:
   a box unit configured to house the electronic component, and the box unit having an opening surface formed thereon, and
   a lid unit configured to cover the opening surface, wherein
an inside of the box unit having the opening surface covered by the lid unit is filled with a sealant,
the lid unit has (i) a middle lid configured to cover the opening surface and come into contact with the sealant, and (ii) at least one outer lid located at an outer side of the box unit and farther away therefrom than the middle lid,
the detector has an introduction pipe configured to communicatively connect the detector to an outside of the casing,
the middle lid has a pipe insertion hole formed therein into which the introduction pipe is inserted,
a tip end portion of the introduction pipe is located in the at least one outer lid, and
each of the at least one outer lid has one or a plurality of vents formed therein.

2. The tire condition detecting device according to claim 1, wherein
the middle lid has a first hole portion and a second hole portion formed therein, the second hole portion located at a different position from the first hole portion,
an elastic member is provided on each of a peripheral edge of the first hole portion and a peripheral edge of the second hole portion, and
a closed space is formed between the outer lid and the middle lid with the elastic member in between.

3. The tire condition detecting device according to claim 2, wherein
the at least one outer lid has a recessed portion formed therein, the recessed portion recessed outwardly of the box unit,
the tip end portion of the introduction pipe is located in the recessed portion, and
the recessed portion has one or a plurality of vents formed therein.

4. The tire condition detecting device according to claim 3, wherein
another elastic member is provided on a peripheral edge of the pipe insertion hole.

* * * * *